United States Patent
Sircar et al.

[11] 3,821,211
[45] *June 28, 1974

[54] PROCESS FOR THE PREPARATION OF 4-HYDROXY-3-(5-METHYL-3-ISOXAZOLYCARBAMOYL)-2-METHYL-2H-1,2-BENZOTHIAZINE 1,1-DIOXIDE

[75] Inventors: Jagadish C. Sircar, Dover; Harold Zinnes, Rockaway; John Shavel, Jr., Mendham, all of N.J.

[73] Assignee: Warner-Lambert Company, Morris Plains, N.J.

[*] Notice: The portion of the term of this patent subsequent to Apr. 30, 1991, has been disclaimed.

[22] Filed: Mar. 10, 1972

[21] Appl. No.: 233,712

[52] U.S. Cl. ............ 260/243 R, 424/246
[51] Int. Cl. ............................. C07d 93/02
[58] Field of Search .................. 260/243 R

[56] References Cited
UNITED STATES PATENTS
3,704,298  11/1972  Zinnes et al. .................. 260/243

*Primary Examiner*—John M. Ford
*Attorney, Agent, or Firm*—Albert H. Graddis; Frank S. Chow; Anne M. Kelly

[57] ABSTRACT

A process for the production of the compound of the formula:

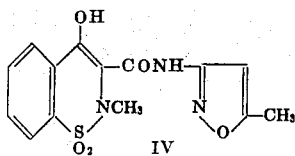

is described.

This process comprises treating compound I:

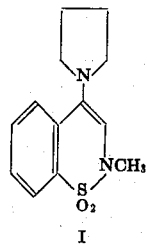

with phosgene and triethylamine to form the compound enamine-acid chloride. This enamine-acid chloride is treated with 3-amino-5-methylisoxazole to give the corresponding enamine-amide, followed by hydrolysis to give the above described compound.

2 Claims, No Drawings

PROCESS FOR THE PREPARATION OF 4-HYDROXY-3-(5-METHYL-3-ISOXAZOLYCARBAMOYL)-2-METHYL-2H-1,2-BENZOTHIAZINE 1,1-DIOXIDE

The present invention is concerned with a novel process and, more particularly, the present invention is concerned with the production of 4-hydroxy-3-(5-methyl-3-isoxazolylcarbamoyl)-2-methyl-2H-1,2-benzothiazine 1,1-dioxide having the following structural formula:

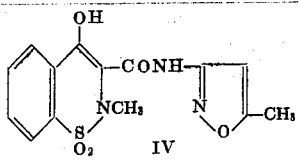

As disclosed in our copending application, Ser. No. 119,967 filed March 1, 1971 now abandoned, this compound exhibits antiinflammatory activity and is a desirable therapeutic agent for the treatment of certain inflammatory conditions.

According to the present invention a new and different process is described for the production of this compound. Broadly speaking, this process is represented by the following schematic diagram:

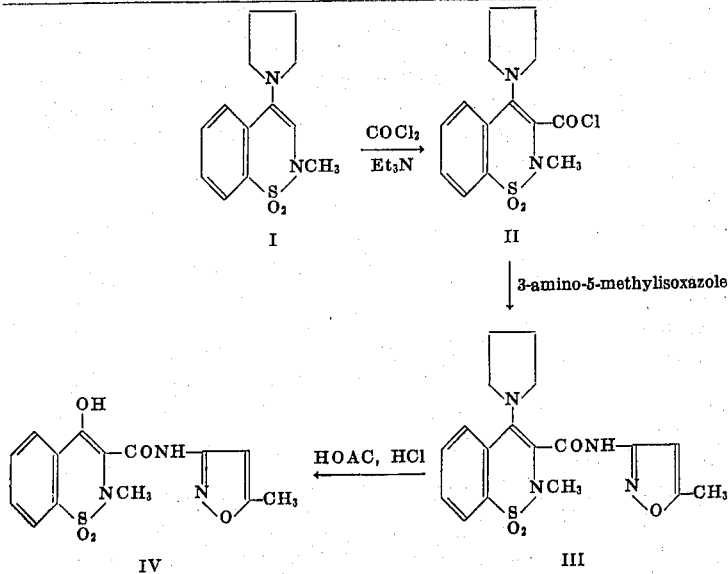

Referring to the above diagram, compound I is treated with phosgene and triethylamine at a low temperature such as from −40° to −55° C. in an inert solvent to form enamine-acid chloride II. The resulting compound II is treated with 3-amino-5-methylisoxazole to give the enamine-amide III which is readily hydrolyzed under acidic conditions to give the desired compound IV.

The starting compound I is prepared as described by Zinnes, et al. in the Journal of Organic Chemistry 31, 162 (1966).

The intermediate compound III, in addition to being useful as an intermediate for production of the desired compound IV, also exhibits anti-inflammatory activity. For example, in the carrageenin test in rats it is effective at a dose of about 100 mg/kg.

The method as to how to use compound IV is fully described in said copending application.

To further illustrate the practice of this invention, the following examples are included:

EXAMPLE 1

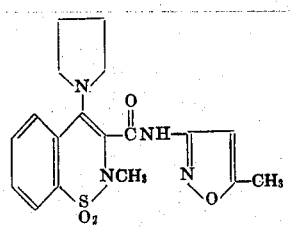

2-Methyl-N-(5-methyl-3-isoxazolyl)-4-(1-pyrrolidinyl)-2H-1,2-benzothiazine-3-carboxamide 1,1-dioxide A solution of 2.5 g. (0.025 mole) of phosgene in 23 ml. of benzene was diluted with 50 ml. of dry tetrahydrofuran. This was cooled to −40° and a solution of 6.6 g. (0.025 mole) of 2-methyl-4(1-pyrrolidinyl)-2H-1,2-benzothiazine 1,1-dioxide and 2.5 g. (0.025 mole) of triethylamine in 200 ml. of tetrahydrofuran was added slowly with stirring over a period of 30 minutes while the temperature was maintained at −40° to −55°. The reaction mixture was then stirred at room temperature for 4 hrs., cooled to −70°, and a solution of 5.5 g. (0.055 mole) of 3-amino-5-methylisoxazole in 100 ml. of tetrahydrofuran was slowly added. The mixture was allowed to warm to room temperature, stirred for 64 hrs., treated with ice-water, and extracted with dichloromethane. The organic layer was washed twice with water, dried ($Na_2SO_4$), and evaporated. Trituration of the residue with ether gave 6.0 g. (62%) of crystalline product, m.p. 184°–188° dec., which was sufficiently pure for use in the next step. Recrystallization from tetrahydrofuran gave 4.8 g. of analytically pure material, m.p. 197°–200° dec.

Anal. calcd. for $C_{18}H_{20}N_4O_4S$: C, 55.66; N, 5.19; N, 14.42; S, 8.25.

Found: C, 55.89; N, 5.19; N, 14.57; S, 8.28.

EXAMPLE 2

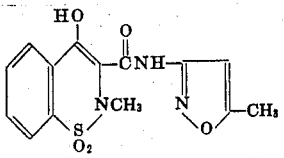

4-Hydroxy-3-(5-methyl-3-isoxazolylcarbamoyl)-2-methyl-2H-1,2-benzothiazine 1,1-dioxide A solution of 1.2 g. of unrecrystallized 2-methyl-N-(5-methyl-3-isoxazolyl-4-(1-pyrrolidinyl)-2H-1,2-benzothiazine-3-carboxamide 1,1-dioxide in 30 ml. of glacial acetic acid was heated on a steam bath and 30 ml. of 1 N hydrochloric acid was added. Heating was continued for 45 minutes during which time some of the product separated from solution. The reaction mixture was diluted with ice-water to a volume of 300 ml. and filtered to give 1.0 g. (97%) of material, m.p. 255°–260° dec. This was shown by mixture m.p. and comparison of infrared spectra to be identical with the substance prepared by the reaction of 3-carbethoxy-4-hydroxy-2-methyl-2H-1,2-benzothiazine 1,1-dioxide with 3-amino-5-methylisoxazole.

We claim:
1. A process for the production of the compound of the formula:

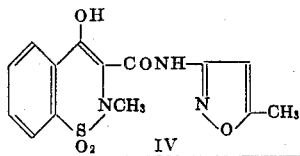

which comprises treating a compound of the formula:

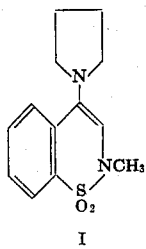

with phosgene and triethylamine to form the enamine-acid chloride having the formula:

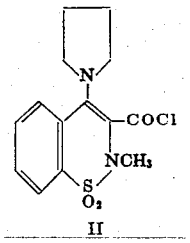

and treating said compound II with 3-amino-5-methylisoxazole to give the enamine-amide having the formula:

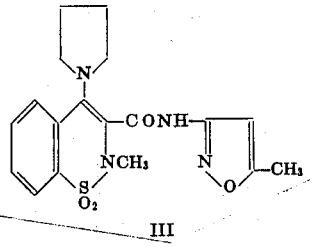

and hydrolyzing said enamine-amide III to IV by the use of aqueous acid.

2. A compound of the formula:

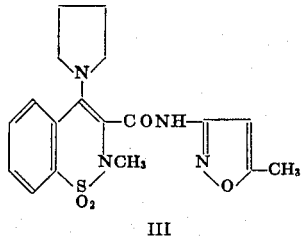

* * * * *

UNITED STATES PATENT OFFICE
CERTIFICATE OF CORRECTION

Patent No. 3,821,211          Dated June 28, 1974

Inventor(s) JAGADISH C. SIRCAR, ET AL.

It is certified that error appears in the above-identified patent and that said Letters Patent are hereby corrected as shown below:

Column 1, Line 19, cancel "abandoned" and insert

"U. S. Patent 3,787,324."

Signed and sealed this 29th day of October 1974.

(SEAL)
Attest:

McCOY M. GIBSON JR.
Attesting Officer

C. MARSHALL DANN
Commissioner of Patents